Dec. 17, 1957 G. H. SCHURGER 2,816,485
COMBINATION OPERATOR PLATFORM AND ELEVATOR FOR MACHINE TOOLS
Filed May 13, 1954 6 Sheets-Sheet 1
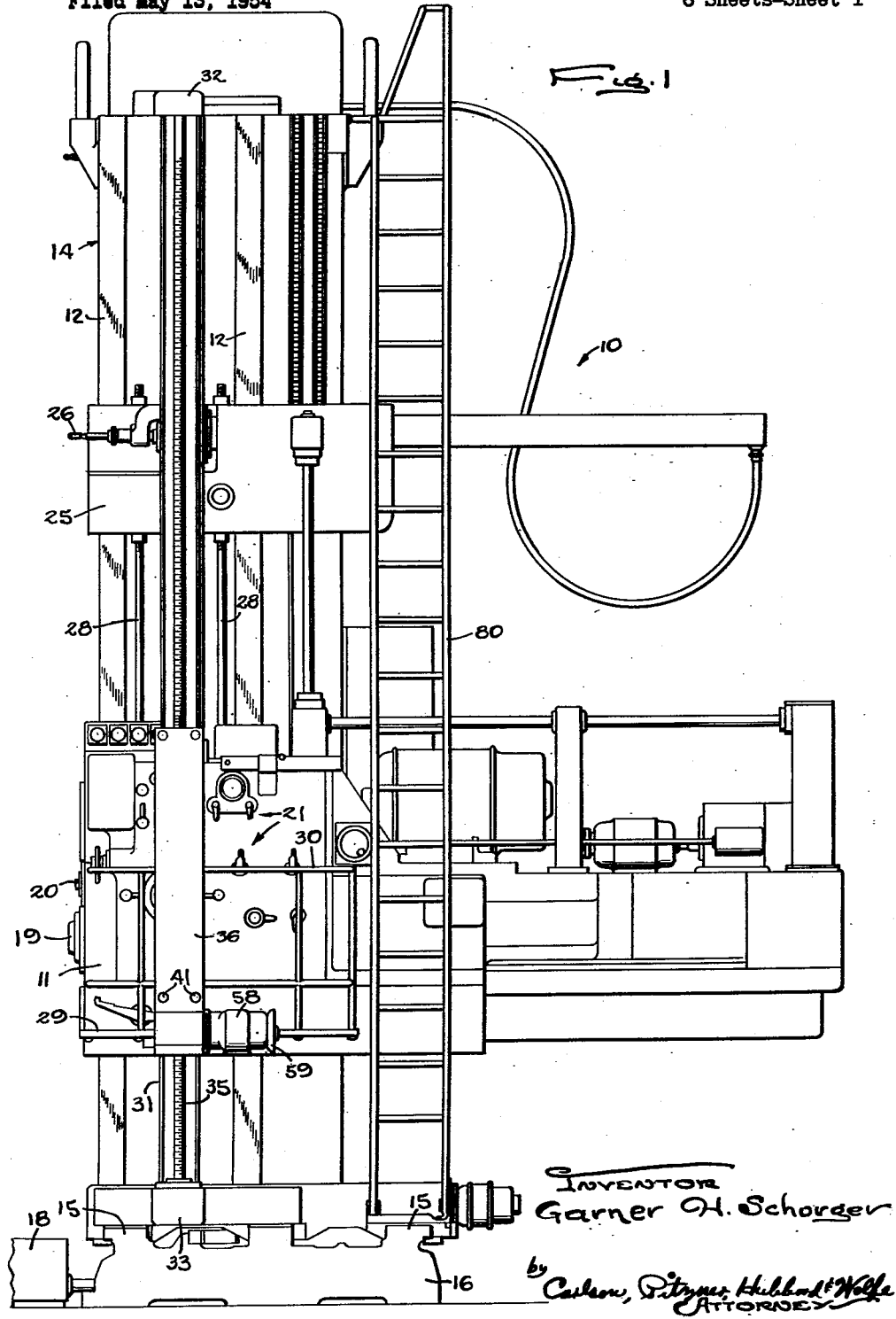

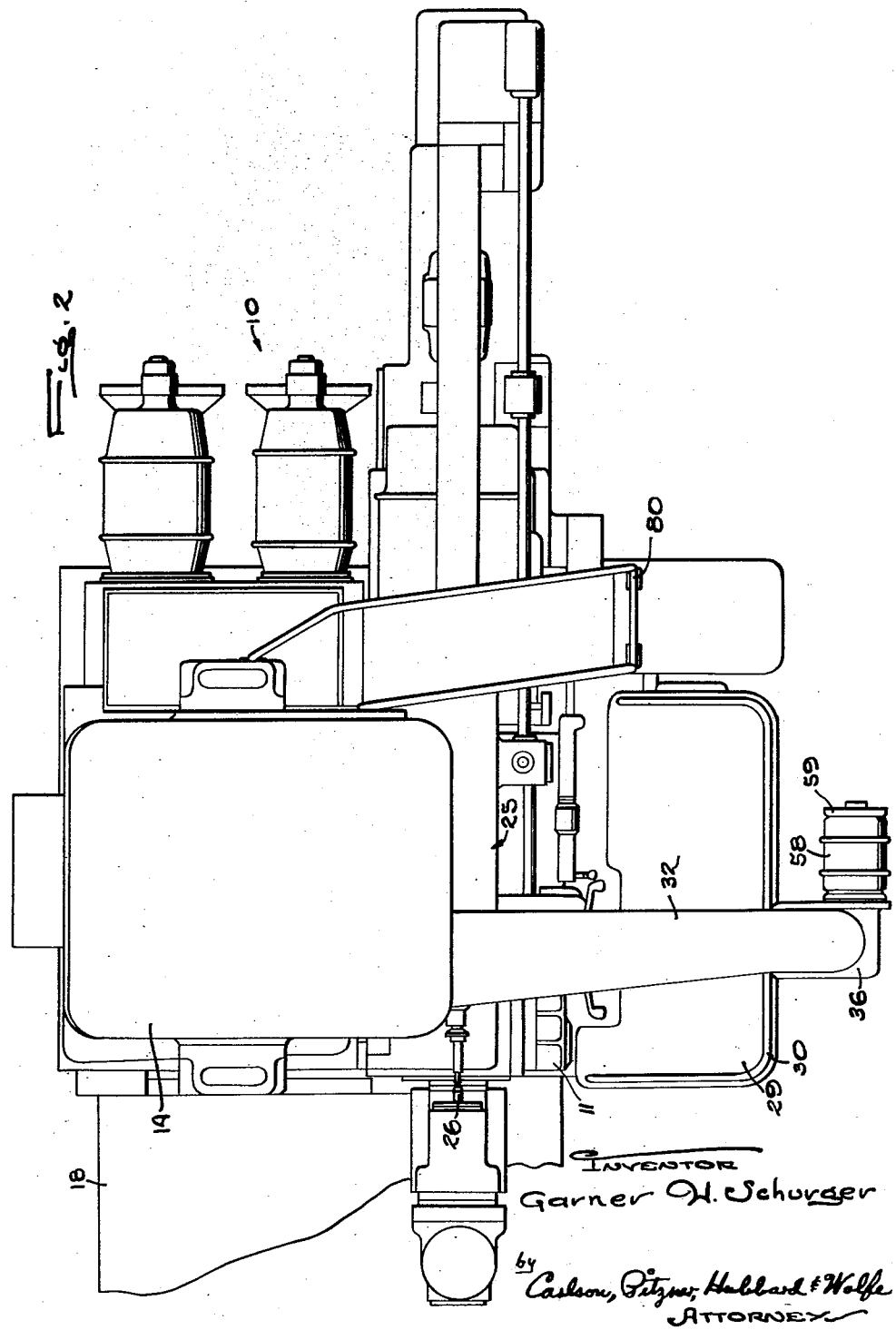

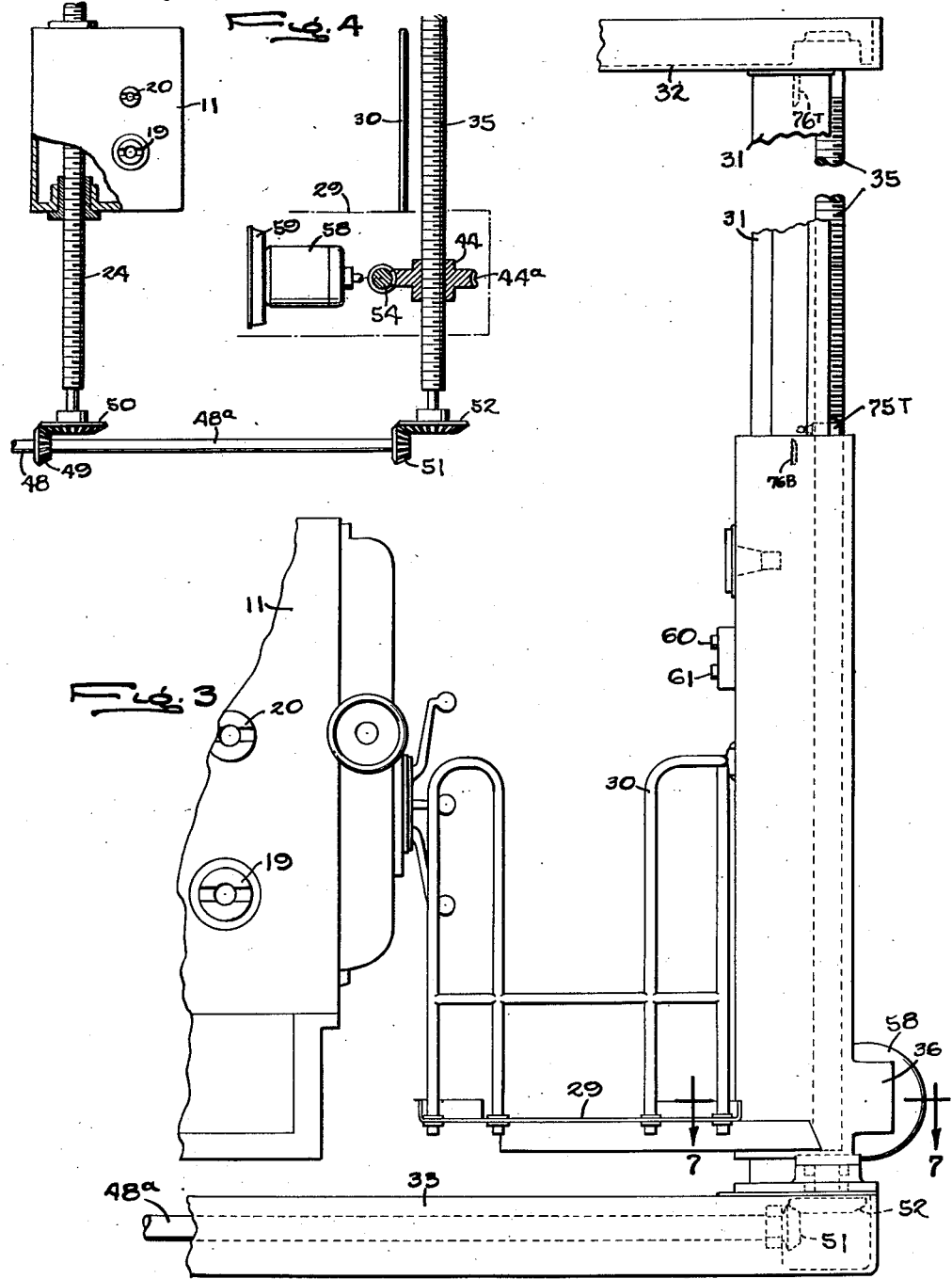

INVENTOR
Garner H. Schurger
by Carlson, Pitzner, Hubbard & Wolfe
ATTORNEY

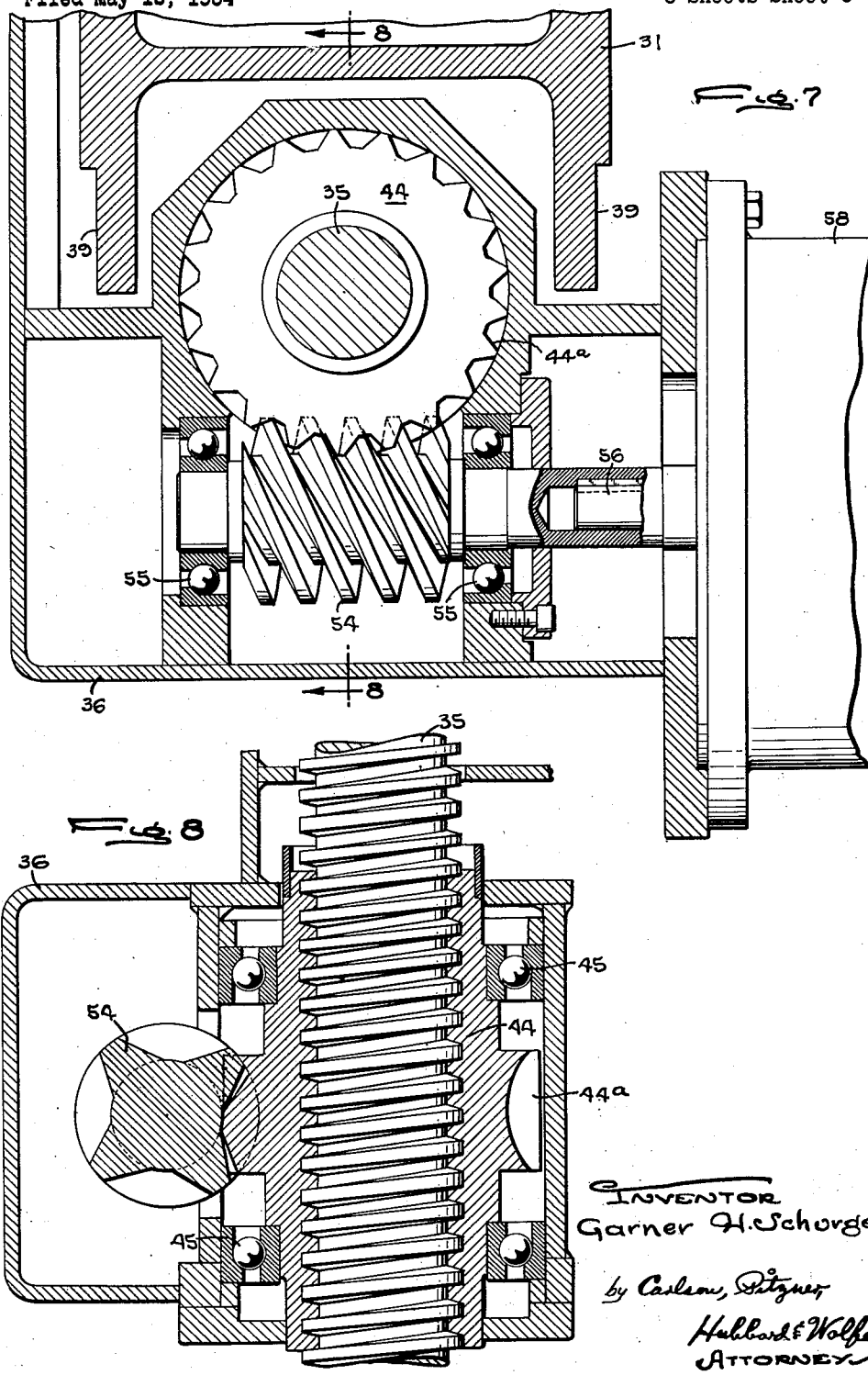

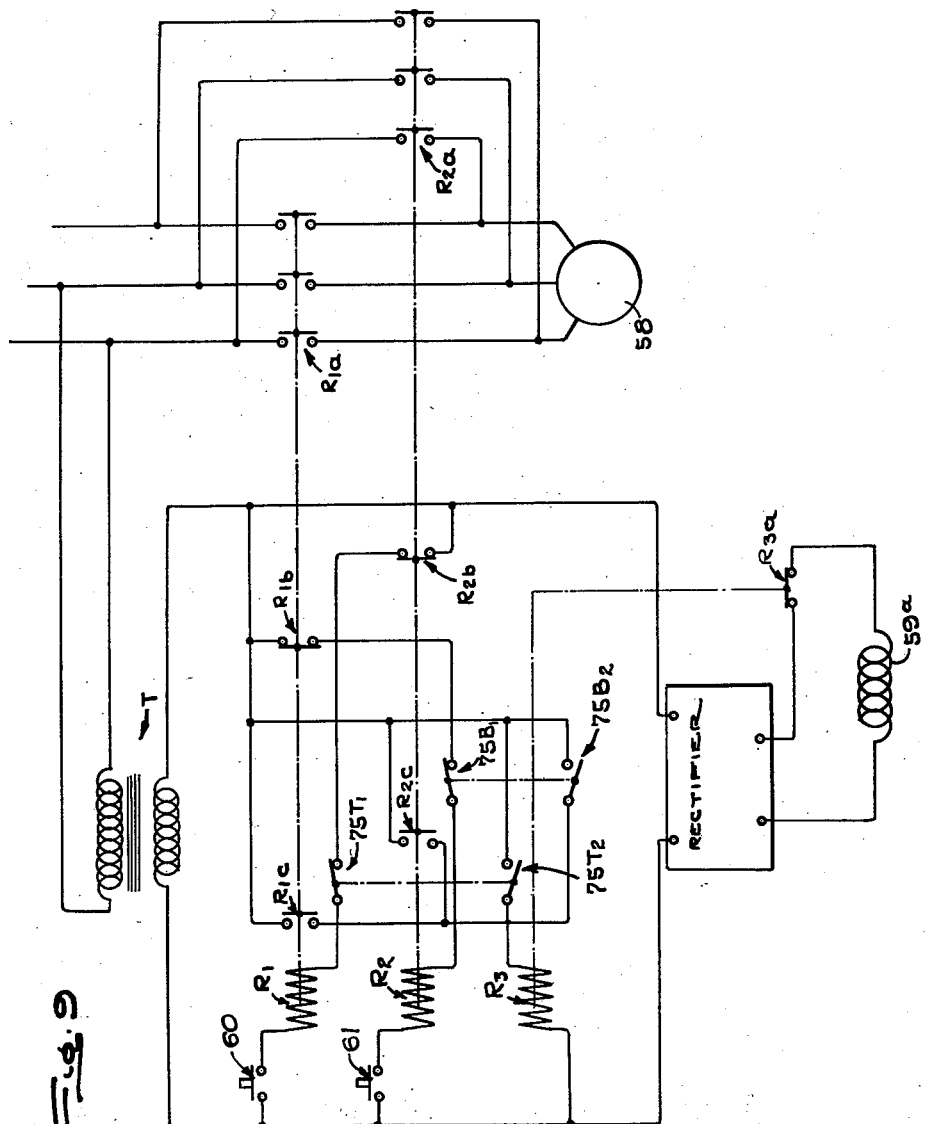

United States Patent Office

2,816,485
Patented Dec. 17, 1957

2,816,485

COMBINATION OPERATOR PLATFORM AND ELEVATOR FOR MACHINE TOOLS

Garner H. Schurger, Fond du Lac, Wis., assignor to Giddings & Lewis Machine Tool Company, Fond du Lac, Wis., a corporation of Wisconsin Application May 13, 1954, Serial No. 429,578

10 Claims. (Cl. 90—11)

The present invention pertains to improvements in machine tools.

The general aim of the invention is to make it possible for the operator of one of the huge machine tools encountered in current practice, to be always in position for effective manipulation of the intricate controls he must deal with, to have a good view of the progress of the work, and yet not to be fatigued with constant climbing, twisting and turning in crawling over the machine. On his quickness of perception and shrewdness of judgment depends not only the safety of the machine itself but also that of the elaborate work in which a large investment of time and money has often already been made.

Additional objects and advantages of the invention will become apparent as the following description proceeds, taken in conjunction with the accompanying drawings, in which:

Figure 1 is a front elevation of an exemplary machine tool provided with a combination operator platform and elevator constructed in accordance with the features of the present invention;

Fig. 2 is a plan view corresponding to Fig. 1;

Fig. 3 is a fragmentary side elevation of the machine headstock, the operator platform, and the elevating means for the latter;

Fig. 4 is a diagrammatic elevational view which is similar to Fig. 3, showing the combined drive of the machine headstock and the operator platform;

Fig. 7 is a detail view taken in horizontal section substantially along the line 7—7 in Fig. 3;

Fig. 8 is a detail view taken in vertical section substantially along the line 8—8 in Fig. 7; and Fig. 9 is a schematic diagram of an electric control circuit for the elevator platform.

Figure 6:
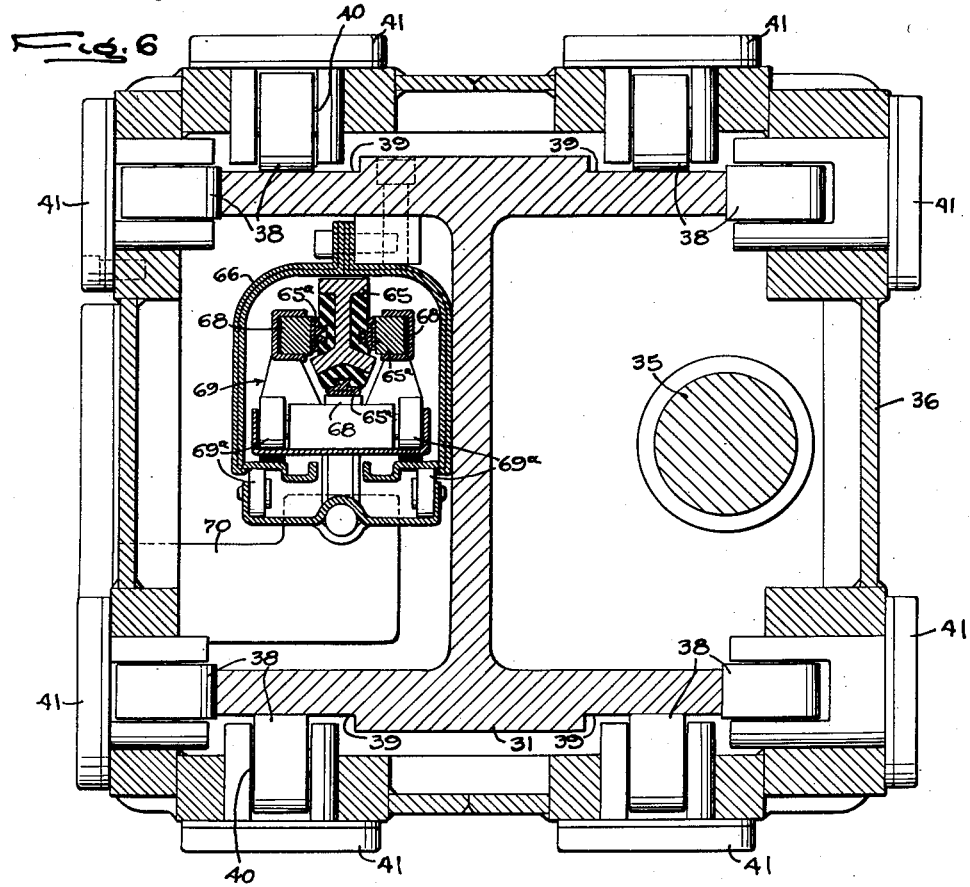
Fig. 6 is a horizontal section, taken generally along the line 6—6 in Fig. 5 and showing details of the platform slide or trolley engaged with a vertical guide beam.

While the invention is shown and described in detail with reference to a particular embodiment thereof, there is no intention to thereby limit it to such detail. On the contrary, the intention is to cover all alterations, modifications and equivalents falling within the spirit and scope of the invention as defined in the appended claims.

The machine tool which has been selected to illustrate one application of the invention is a horizontal boring, drilling and milling machine 10 (Figs. 1 and 2) having a vertically movable element or headstock 11 which is translatable along vertical ways 12 carried by an upright column 14. The column 14 is movable along horizontal ways 15 formed on a base 16 from which a work bed 18 (partially shown) extends. Although the details of this particular machine tool are shown only by way of example and such details may vary in the practice of the present invention, the headstock 11 may be of the general type disclosed in Gallimore Patent 2,251,015 and may be provided with main and auxiliary horizontal spindles 19 and 20, together with numerous control levers and switches 21. The headstock is raised and lowered by power means driving a vertical elevating screw 24 (Fig. 4) which is journaled in the column 14 and engaged with a nut member on the headstock itself. The headstock during such movement slides along the ways 12 between their upper and lower extremities.

The machine tool 10 also is equipped with a tracer head 25 having a stylus 26 adapted to follow the contour of a master pattern (not shown) and through appropriate control circuits to cause relative movement between a cutting tool on one of the spindles 19 or 20 and the workpiece (not shown) so that the latter is machined to the same shape as the pattern. The tracer head 25 is mounted on a slide movable along the vertical ways 12 and rigidly attached to the headstock by two tie-rods 28. The tracer head 25 thus moves in unison with the headstock 11 along the ways 12, although it is adjustable in a vertical direction relative to the headstock by threads and cooperating nuts provided at the upper ends of the tie-rods 28.

In accordance with the present invention, a novel arrangement has been provided in the illustrated machine for making it possible for an operator to be always in touch with the controls 21 as the headstock 11 goes up and down the towering column and yet with full freedom to move swiftly to any other vertical location on the machine where his presence is required. Pursuant to that purpose a platform 29 is guided for vertical movement along a path adjacent the vertical path of the headstock, and elevating means are provided for raising or lowering the platform optionally in unison with the headstock or independently of the latter.

As shown in this instance, the machine tool 10 is equipped with the combination operator support and elevator platform 29 having a guard railing 30. The platform 29 is vertically slidable along a guide beam 31 extending for support between the outer ends of a pair of horizontal extension arms or brackets 32 and 33 mounted respectively at the upper and lower ends of the column 14. A vertical elevating screw 35 for the platform 29 is journaled at its upper and lower ends in the extremities of the brackets 32 and 33, such elevating screw being disposed between the flanges of the guide beam 31 which, in this instance, is formed in the configuration of an H-beam.

Figure 5:
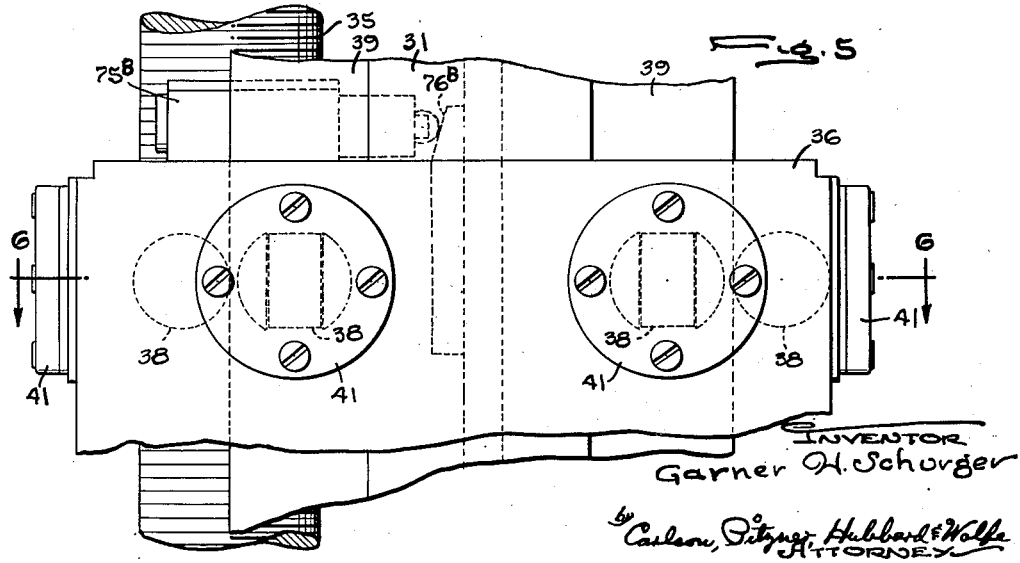
Fig. 5 is a fragmentary elevation showing details of the operator platform drive and limit components.

As shown best in Fig. 3, the platform 29 has attached at one edge a vertical hollow housing 36 which surrounds the guide beam 31 and the elevating screw 35. The housing 36 serves both as a trolley carrier for slidably engaging the guide beam 31 and as a casing which protects the operator's clothing and hands from injury by contact with the guide beam 31 or elevating screw 35. With reference to Fig. 6, it will be seen that the upper end of the housing 36 is equipped with eight rollers 38, four of which engage the edges of the flanges for the H-beam 31, and four of which ride in recessed portions 39 defined in the outer faces of such flanges. By this arrangement, the housing 36 is maintained in alinement with the guide beam 31, yet it has freedom for smooth vertical movement along the guide beam. Preferably as illustrated in Fig. 6, the rollers 38 are journaled on pins 40 inserted through spaced jaws of plugs having cap flanges 41. The plugs are insertable through suitably located apertures in the sides of the housing 36 and may be locked in place by screws as shown in Fig. 5. This permits replacement of the rollers and plugs should an undue amount of wear occur on them, or alternatively, the take-up of such wear by the removal of shims originally located beneath the cap flanges 41.

For cooperating with the elevating screw 35 to move the platform 29 vertically and at the same time to support the housing 36 with proper spacing from the guide beam 31, a nut 44 (Figs. 7 and 8) is journaled in the lower end of the housing 36 by suitable antifriction bearings 45. The nut 44 surrounds the screw 35 and is threadably engaged with the latter so that vertical movement of the platform 29 and the attached housing 36 results from rotation of either the screw 35 or nut 44 relative to the other.

In accomplishing the objects of the invention, provision is made for rotating the elevator screw 35 whenever the headstock screw 24 is driven. And means are provided which are selectively operable to lock the nut 44 against rotation relative to the housing 36. As shown in Fig. 4, the headstock elevating screw 24 is adapted to be drivingly rotated by means of a power shaft 48 suitably connected to a motor (not shown). By selective operation of the controls 21 on the headstock face, the power shaft may be driven in either direction and at variable speeds to raise or lower the headstock. The shaft 48 has a bevel gear 49 meshed with a mating gear 50 on the lower end of the screw 24. The shaft 48 also includes an extension 48a which is jounaled in and projects through the lower bracket 33 and which carries at its extreme end a second bevel gear 51 which is in driving engagement with a mating gear 52 fast on the lower end of the elevator screw 35. The mechanical ratios for gears 49 and 50 and for gears 51 and 52 are so chosen with regard to the pitches of the elevating screws 24 and 35 that the headstock 11 and platform 29 move in unison whenever the power shaft 48 is rotated. For example, if the pitches of the screws 24 and 35 are the same, then the mechanical ratios for the gears 49, 50 and 50, 52 would be identical.

As here illustrated, the means for selectively locking the nut 44 against rotation relative to the housing 36 include a worm 54 (Fig. 7) journaled by suitable antifrictoin bearings 55 in the housing and reversibly engaged with a worm gear 44a formed integrally on the external surface of the nut 44. The worm 54 has socketed and keyed engagement with a motor shaft 56 for a motor 58, the opposite end of the motor shaft extending into a brake device 59 (Fig. 4), preferably one which is adapted to be electrically energized. It will be seen, that whenever the brake 59 is energized, the motor shaft 56, the worm 54, and the nut 44 are all prevented from rotating and that rotation of the elevating screw 35 under these conditions raises or lowers the platform 29. And because the platform elevating screw 35 is driven whenever the headstock elevating screw 24 is driven, the platform 29 will move in unison with the headstock under these conditions, a selected spacing or adjustment of the two being maintained.

In order that the platform 29 may serve as an elevator when the headstock remains stationary, provision is made for moving the platform vertically and independently of the headstock. To this end, the nut 44 is arranged to be driven by the electric motor 58 when the brake device 59 is released. When the headstock 11 is stationary both the elevating screws 24 and 35 will also be stationary. Under these conditions, with the brake 59 released and the motor 58 energized, the resultant rotation of the worm 54 and the nut 44 serves to raise or lower the platform 29 according to the direction in which the motor 58 is turned. In order that the platform 29 may be both raised and lowered, therefore, the motor 58 is reversible and provided with suitable controls to be more fully described. Briefly, it may be observed at this point that control push-buttons 60 and 61 are located on the inner side of the housing 36 for convenient operation by an operator. Actuation of the push-button switch 60 releases the brake 59 and turns the motor 58 in a first direction to raise the platform 29, while actuation of the push-button 61 releases the brake and energizes the motor to turn in the opposite direction to lower the platform 29.

In order to supply electric power to the motor 58 and the brake device 59 under the control of the push-buttons 60 and 61 and a control circuit to be more fully described, stationary bus and sliding contact means are provided respectively on the guide beam 31 and the housing 36. As shown more particularly in Fig. 6, a three-phase stationary vertical bus 65 is rigidly mounted within the flanges of the guide beam 31 and suitably surrounded by a protective casing 66. The bus 65 includes three contact strips 65a suitably mounted in strips of insulating material and engaged by sliding contacts 68 which move with the housing 36. In the specific bus structure here illustrated, the sliding contacts 68 are mounted on a carrier 69 which is supported by a hollow arm 70 rigidly fastened to and projecting inwardly from the housing 36. The necessary wiring (not shown) leading to the motor 58, brake 59, and other control components may be passed through the arm 70. The carrier 69 extends through a slot in the casing 66 and has rollers 69a riding on opposite sides of the casing 66 to provide smooth sliding engagement.

To prevent the housing 36 from striking the upper and lower brackets 32 and 33, through inadvertence of an operator, two limit switches 75T and 75B are mounted on the upper end of the housing 36 and respectively adapted for cooperative engagement with actuating cam strips 76T and 76B welded or otherwise fastened to the web of the guide beam 31 (Fig. 3). The cam strips 76T and 76B are suitably located in a vertical direction such that the corresponding one of switches 75T and 75B are actuated whenever the top of the housing 36 approaches the upper bracket 32 or the lower end of the housing 36 approaches the lower bracket 33. These switches are arranged, in a manner to be more fully described, such that they deenergize the brake 59 and motor 58. Thus, whether the platform 29 is being raised or lowered in unison with the headstock 11 or independently of the headstock, actuation of the limit switches 75T or 75B releases the nut 44 for free rotation relative to the housing 36 and prevents further vertical movement of the platform 29.

Referring next to Fig. 9, a schematic diagram of an exemplary electric control circuit for the combination support and elevator platform is there shown. The motor 58 is in this instance a three-phase induction motor connected for energization from a voltage source through either of two sets of relay contacts $R_{1-a}$ and $R_{2-a}$ respectively. It will be apparent that the motor 58 runs in one direction or the other, thereby raising or lowering the platform 29, depending upon which set of contacts is closed. The contacts $R_{1-a}$ and $R_{2-a}$ are controlled respectively by relay coils $R_1$, and $R_2$, the latter being connected in series respectively with the push-button switches 60 and 61 across a single phase circuit supplied through a transformer T. Normally closed contacts $R_{2-b}$ and $R_{1-b}$ controlled by the respective relay coils $R_2$ and $R_1$, are connected in series with the coils $R_1$ and $R_2$, respectively, thereby assuring that both the contacts $R_{1-a}$ and $R_{2-a}$ cannot be simultaneously closed.

A brake coil 59a for the electro-magnetic brake 59 is supplied with direct current through a rectifier and normally closed contacts $R_{3-a}$ of a control relay. The latter relay includes a coil $R_3$ which is connected in series with the parallel combination of contacts $R_{1-c}$ and $R_{2-c}$ respectively controlled by the coils $R_1$ and $R_2$. Normally, therefore, the coil $R_3$ is deenergized, and the brake coil 59a energized to lock the nut 44 against rotation relative to the platform 29 and housing 36. Driving of the lead screws 24 and 35 will thus cause the headstock 11 and platform 29 to be raised or lowered in unison. However, when either of the switches 60 or 61 is closed, and thus either the coil $R_1$ or $R_2$ energized, the coil $R_3$ will be energized and the contacts $R_{3-a}$ opened to release the brake 59. Thus, the motor 58, energized through either the contacts $R_{1-a}$ or $R_{2-a}$, may drive the nut 44 relative to the stationary screw 35 to raise or lower the platform 29 independently of and relative to the headstock 11.

In the event that the platform 29 reaches either its top or bottom limit of travel, whether moving in unison with the headstock 11 or relative to the latter under drive from the motor 58, the limit switches 75A and B prevent it from moving farther and damaging the machine. Each of the limit switches has one normally closed and one normally open set of contacts. The first limit switch 75T is actuated by the cam strip 76T at the top of the guide beam 31 (Fig. 3) and has its normally closed contacts $75T_1$ (Fig. 9), connected in series with the coil $R_1$ to thereupon effect deenergization of the motor even if the switch 60 is inadvertently held closed. The second limit switch 75B is actuated by the second cam abutment 76B at the midportion of the guide beam 31 (Fig. 3) when the lower end of the housing 36 approaches the bracket 33. The normally closed contacts $75B_1$, of this latter switch are connected in series with the coil $R_2$ to thereupon deenergize the latter coil and prevent the motor 58 from lowering the platform further.

Additionally, the two limit switches 75 have their respective normally open contacts $75T_2$ and $75B_2$ connected in parallel with the contacts $R_{1-c}$ and $R_{2-c}$, that is, individually in series with the coil $R_3$. When either of the limit switches is actuated, the coil $R_3$ is energized and the brake coil 59a is deenergized to release the nut 44 for free rotation. In the event that the platform 29 reaches one limit of its travel before the headstock 11 as the two are being raised or lowered in unison, the nut 44 is released and simply turns freely with the screw 35. The platform 29 thus remains stationary at its limit position while the headstock 11 may continue to move.

By this arrangement complete safety is provided whether the platform is being moved by power from either the extension shaft 48a (Fig. 4) or the motor 58. And the headstock 11 is not halted in case the platform reaches its limit position first as the two are driven in unison from a common drive shaft.

Résumé of operation

While the operation of the novel combination support and elevator platform will be clear from the foregoing, a brief summary will be useful. The operator, at the beginning of a day's work, may step on the lowered platform 29 and operate the push-button switch 60 so as to elevate the platform to a convenient level adjacent the headstock 11 regardless of where the latter may be. The vertical position of the platform 29 relative to the headstock may be adjusted to suit the preference of the individual operator. The operation of the switch 60 energizes the motor 58 and releases the brake device 59 so that the nut 44 is rotated relative to the stationary elevating screw 35 in effecting this initial raising of the platform.

If the headstock 11 is moved vertically during machining operations, as by causing the power shaft 48 to be rotated, the platform 29 will automatically be moved a corresponding amount by virtue of the common drive connection of the lead screws 24 and 35 with the power shaft 48. Thus, the previously adjusted relationship of the platform 29 and headstock 11 will be maintained. When the operator desires to descend to the shop floor, while not wishing to disturb the position of the headstock in an incomplete machining process, he merely operates the push-button 61 so as to release the brake 59 and energize the motor 58 in the opposite sense. The nut 44 will thereby be driven in the opposite direction so as to lower the platform 29. If at any time it is necessary to service the tracer head 25 the operator may raise and lower the platform independently of the headstock 11 simply by utilizing the push-button switches 60 and 61.

While with the arrangement shown it is possible for an operator to have complete access to any part of the vertical column by riding up and down on the elevator platform 29, a ladder 80 has been illustrated connected with the machine in Fig. 1. This ladder 80 is solely for emergency or occasional use, as for example, when all electric power has been shut off from the machine 10. This ladder 80 may be integrally connected with the vertical column 14 as in prior conventional arrangements. It will be evident, however, that the present invention eliminates virtually all necessity for climbing a ladder. Accordingly, operator fatigue and the hazards of ladder climbing are reduced to insignificance.

I claim as my invention:

1. In a machine tool, the combination of a vertical column, ways on said column, a headstock having controls and being vertically movable along said ways, a power driven reversible elevating screw journaled on the column for raising and lowering the headstock, a platform for supporting an operator adjacent said headstock in position to actuate said controls, means for guiding said platform for vertical movement adjacent the headstock, a platform elevating screw for raising and lowering said platform, means for connecting said platform and headstock elevating screws so that the former will be rotated when the latter is driven, a nut journaled on said platform and having threaded engagement with said platform elevating screw, means for locking said nut against rotation relative to said platform whereby the platform and headstock are raised and lowered in unison, power means on said platform for rotating said nut in either direction, and means for simultaneously releasing said locking means and energizing said power means to thereby raise or lower said platform relative to the machine headstock.

2. The combination set forth in claim 1 further including means actuated by said platform upon reaching the end of its travel in either direction for releasing said locking means to permit free rotation of said nut and leave said platform stationary notwithstanding continued rotation of said platform elevating screw.

3. In a machine tool, the combination comprising a column, a headstock vertically movable along the column and having controls thereon, a reversible power driven elevating screw for raising and lowering said headstock, a platform vertically movable adjacent said headstock to support an operator in position to actuate said controls, a platform elevating screw for raising and lowering said platform, means for interconnecting said two elevating screws to be driven together, a nut journaled on said platform and having threaded engagement with said platform elevating screw, brake means for selectively locking said nut against rotation relative to said platform, power means on said platform selectively energizable to rotate said nut and raise or lower said platform when said platform elevating screw is stationary, and means for simultaneously releasing said brake means whenever said power means are energized.

4. In a machine tool, the combination comprising a vertically movable element having control instrumentalities thereon, a platform vertically movable along a path adjacent that of said element to support an operator in position to actuate said controls, a rotatable elevating screw, a nut journaled on said platform and cooperatively engaged with said screw, means for locking said nut against rotation relative to said platform, means for rotatably driving said screw in opposite directions when said movable tool element is raised or lowered to thereby effect movement of said platform in unison with said element, an electric motor mounted on said platform and drivingly connected with said nut, and control means for releasing said locking means and energizing said motor to thereby effect rotation of said nut relative to said platform to cause vertical movement of said platform relative to and independently of the tool element.

5. The combination set forth in claim 4 in which said locking means comprise an electric brake, and further including limit switches actuated by said platform upon reaching the end of its range of movement for deenergizing said brake and said motor to permit free rotation of said nut and leave said platform stationary notwithstanding continued rotation of said elevating screw or actuation of said control means.

6. In a machine tool, the combination comprising a vertically movable tool element having controls thereon, a vertically movable platform for supporting an operator in position to actuate said controls, means for guiding said platform along a vertical path adjacent the tool element, first and second interengaging relatively rotatable elevating components mounted respectively on said machine tool and said platform, means for rotating said first elevating component in opposite directions when said tool element is moved up or down respectively, means for locking said second elevating component against rotation to thereby effect raising and lowering of said platform and tool element in unison, driving means on said platform for rotating said second elevating component relative to said first elevating component, and means for simultaneously releasing said locking means and energizing said driving means to thereby raise and lower said platform relative to and independently of said tool element.

7. In a machine tool installation, the combination of a vertically movable platform for supporting an operator, a feed screw for raising and lowering said platform, a nut in threaded engagement with said feed screw, means rotatably mounting said nut on said platform, means for releasably locking said nut against rotation relative to said platform, selectively operable means for simultaneously releasing said locking means and rotating said nut to effect raising and lowering of said platform, and selectively operable means for actuating said locking means and rotating said feed screw to effect raising and lowering of said platform.

8. In a machine tool, the combination of an operator platform, a vertical elevating screw, means for rotatably driving said screw, a nut freely journaled on said platform and cooperatively engaged with said screw, means for locking said nut against rotation relative to said platform to effect raising and lowering of said platform between predetermined limit positions as an incident to rotation of said screw, and means operative when said platform reaches its limit positions to release said locking means and leave said platform stationary notwithstanding continued rotation of said screw.

9. In a machine tool, the combination comprising an operator platform, a vertical elevating screw, selectively operable means for rotatably driving said screw, a nut freely journaled on said platform and cooperatively engaged with said screw, selectively operable means for locking said nut against rotation relative to said platform to effect raising and lowering of said platform between predetermined limit positions as an incident to rotation of said screw, selectively operable power means for rotatably driving said nut relative to said platform to raise and lower the latter between said limit positions when said screw is stationary, control means for simultaneously releasing said locking means and energizing said power means, and means actuated by said platform upon reaching its limit position for releasing said locking means and deenergizing said power means to stop said platform notwithstanding continued rotation of said screw or actuation of said control means.

10. In a machine tool, the combination of a vertical column, vertically extending guide means on said column, a machine tool element having controls and being vertically movable along said guide means, first power means for raising and lowering said machine tool element, a platform for supporting an operator adjacent said machine tool element in position to actuate said controls, second power means for raising and lowering said platform, and control means movable with said platform for selectively conditioning said first and second power means to raise or lower said platform and said machine tool element in unison or to solely operate said second power means to raise or lower said platform while said machine tool element remains stationary.

References Cited in the file of this patent

UNITED STATES PATENTS

| | | |
|---|---|---|
| 1,958,424 | Gebhard | May 15, 1934 |
| 2,157,471 | Armitage | May 9, 1939 |
| 2,251,015 | Gallimore | July 29, 1941 |
| 2,263,404 | Armitage et al. | Nov. 18, 1941 |
| 2,270,861 | Anderson | Jan. 27, 1942 |
| 2,325,294 | Woytych | July 27, 1943 |